(12) United States Patent
Lutke et al.

(10) Patent No.: US 8,931,739 B1
(45) Date of Patent: Jan. 13, 2015

(54) AIRCRAFT HAVING INFLATABLE FUSELAGE

(75) Inventors: Kevin Reed Lutke, Huntington Beach, CA (US); Aaron Jonathan Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 657 days.

(21) Appl. No.: 12/633,212

(22) Filed: Dec. 8, 2009

(51) Int. Cl.
- *B64C 1/00* (2006.01)
- *B64C 3/00* (2006.01)
- *B64C 5/00* (2006.01)

(52) U.S. Cl.
USPC .................... 244/123.11; 244/119

(58) Field of Classification Search
USPC ......... 244/5, 119, 123.1, 24 R, 24, 30, 117 R, 244/63, 3.24–3.29, 46, 123.11; 264/494, 264/496, 257, 258; 428/35.2
See application file for complete search history.

(56) References Cited

U.S. PATENT DOCUMENTS

| | | | | |
|---|---|---|---|---|
| 2,886,265 | A * | 5/1959 | Ritter et al. | ................ 244/117 R |
| 2,979,287 | A | 4/1961 | Ross | |
| 3,047,257 | A | 7/1962 | Chester | |
| 3,184,187 | A | 5/1965 | Isaac | |
| 3,473,761 | A | 10/1969 | Chutter | |
| 3,711,039 | A | 1/1973 | James | |
| 3,907,218 | A * | 9/1975 | Miller | ............................... 244/5 |
| 3,930,626 | A | 1/1976 | Croswell, Jr. | |
| 3,957,232 | A | 5/1976 | Sebrell | |
| 4,052,025 | A * | 10/1977 | Clark et al. | ..................... 244/25 |
| 4,261,534 | A | 4/1981 | Roselli | |
| 4,349,169 | A | 9/1982 | Mcanally | |
| 4,725,021 | A | 2/1988 | Priddy | |
| 4,979,700 | A | 12/1990 | Tiedeman et al. | |
| 5,005,783 | A * | 4/1991 | Taylor | ............................. 244/97 |
| 5,181,678 | A | 1/1993 | Widnall et al. | |
| 5,425,515 | A * | 6/1995 | Hirose | ............................... 244/5 |
| 5,566,908 | A | 10/1996 | Greenhalgh | |
| 5,662,294 | A | 9/1997 | Maclean et al. | |
| 5,697,579 | A * | 12/1997 | Hayashi | ........................ 244/31 |
| 5,823,468 | A * | 10/1998 | Bothe | ............................... 244/2 |
| 6,015,115 | A | 1/2000 | Dorsett et al. | |
| 6,082,667 | A | 7/2000 | Haggard | |
| 6,138,956 | A | 10/2000 | Monner | |
| 6,199,796 | B1 | 3/2001 | Reinhard et al. | |
| 6,260,797 | B1 | 7/2001 | Palmer | |
| 6,264,136 | B1 | 7/2001 | Weston | |
| 6,286,783 | B1 * | 9/2001 | Kuenkler | ........................ 244/30 |
| 6,347,769 | B1 | 2/2002 | To et al. | |
| 6,419,189 | B1 | 7/2002 | DiChiara, Jr. et al. | |
| 6,431,100 | B2 | 8/2002 | Abshier | |

(Continued)

OTHER PUBLICATIONS

U.S. Appl. No. 12/633,251, filed Dec. 8, 2009, Lutke et al.

(Continued)

*Primary Examiner* — Tien Dinh
*Assistant Examiner* — Michael A Fabula
(74) *Attorney, Agent, or Firm* — Yee & Associates, P.C.

(57) ABSTRACT

A method and apparatus for deploying an aircraft. An inflation system is activated to generate a gas. A fuselage of the aircraft is inflated with the gas. The fuselage comprises a frame for the aircraft and a number of flexible layers associated with the frame in which the number of flexible layers are configured to define a volume for at least a portion of the aircraft when the number of flexible layers are in an inflated configuration.

28 Claims, 10 Drawing Sheets

(56) References Cited

U.S. PATENT DOCUMENTS

| | | | |
|---|---|---|---|
| 6,536,712 B1* | 3/2003 | Barenett | 244/158.3 |
| 6,568,631 B1* | 5/2003 | Hillsdon | 244/30 |
| 6,568,640 B1* | 5/2003 | Barnett | 244/158.3 |
| 6,622,974 B1 | 9/2003 | Dockter et al. | |
| 6,648,272 B1* | 11/2003 | Kothmann | 244/97 |
| 6,786,456 B2* | 9/2004 | Veal et al. | 244/158.3 |
| 6,957,949 B2 | 10/2005 | Hyde et al. | |
| 7,093,789 B2* | 8/2006 | Barocela et al. | 244/30 |
| 7,137,592 B2* | 11/2006 | Barocela et al. | 244/29 |
| 7,185,851 B2* | 3/2007 | Elam | 244/123.11 |
| 7,306,187 B2* | 12/2007 | Lavan | 244/123.11 |
| 7,424,988 B2 | 9/2008 | McDonnell | |
| 7,770,962 B1 | 8/2010 | Maxwell | |
| 7,777,165 B2 | 8/2010 | Sanderson et al. | |
| 7,866,601 B2* | 1/2011 | Balaskovic | 244/96 |
| 7,963,485 B2 | 6/2011 | Koneczny | |
| 8,042,772 B2 | 10/2011 | Lutke et al. | |
| 8,104,713 B2 | 1/2012 | Sanderson | |
| 8,109,462 B2* | 2/2012 | Balaskovic | 244/29 |
| 8,393,576 B2 | 3/2013 | Lutke et al. | |
| 8,616,503 B2* | 12/2013 | Balaskovic | 244/175 |
| 2001/0018024 A1 | 8/2001 | Hyde et al. | |
| 2001/0047745 A1 | 12/2001 | Abshier | |
| 2002/0003189 A1* | 1/2002 | Kuenkler | 244/26 |
| 2003/0001044 A1* | 1/2003 | Munk | 244/24 |
| 2003/0192985 A1* | 10/2003 | Lipeles | 244/13 |
| 2004/0046085 A1* | 3/2004 | Veal et al. | 244/158 R |
| 2004/0195431 A1* | 10/2004 | Yumlu et al. | 244/2 |
| 2004/0205997 A1* | 10/2004 | Youngblood | 48/197 R |
| 2005/0151007 A1 | 7/2005 | Cadogan et al. | |
| 2005/0191930 A1* | 9/2005 | Foster et al. | 446/57 |
| 2005/0258305 A1* | 11/2005 | Piers et al. | 244/26 |
| 2005/0258306 A1* | 11/2005 | Barocela et al. | 244/30 |
| 2008/0083847 A1 | 4/2008 | Mau | |
| 2008/0179454 A1* | 7/2008 | Balaskovic | 244/30 |
| 2009/0108135 A1 | 4/2009 | Shaw | |
| 2009/0206192 A1 | 8/2009 | Sanderson et al. | |
| 2009/0206196 A1 | 8/2009 | Parks et al. | |
| 2009/0224108 A1 | 9/2009 | Lutke et al. | |
| 2010/0001128 A1* | 1/2010 | Morehead et al. | 244/100 A |
| 2010/0077693 A1* | 4/2010 | Cheynet de Beaupre | 52/645 |
| 2010/0096493 A1* | 4/2010 | Khakimov et al. | 244/25 |
| 2010/0237192 A1 | 9/2010 | Sanderson et al. | |
| 2011/0084174 A1 | 4/2011 | Hemmelgarn et al. | |
| 2011/0163200 A1* | 7/2011 | Balaskovic | 244/30 |
| 2011/0168324 A1 | 7/2011 | Ender | |
| 2012/0018571 A1* | 1/2012 | Goelet | 244/30 |
| 2012/0043416 A1* | 2/2012 | Morehead et al. | 244/100 A |
| 2012/0048990 A1 | 3/2012 | Sommer | |

OTHER PUBLICATIONS

U.S. Appl. No. 12/633,272, filed Dec. 8, 2009, Lutke et al.
Cadogan et al., "Inflatable Composite Habitat Structures for Lunar and Mars Exploration", IAAA-98-IAA.13.2.04, 49th International Astronautical Congress, Sep. 1998, 9 Pages, accessed Feb. 7, 2008, <http://www.ilcdover.com/products/aerospace_defense/uav_techpapers.htm>.
Cadogan et al., "Inflatable and Rigidizable Wings for Unmanned Aerial Vehicles", AIAA-2003-6630, 9 Pages, accessed Feb. 7, 2008 <http://www.ilcdover.com/products/aerospace_defense/uav_techpapers.htm>.
ILC Dover LP, "Low Packing Volume Inflatable UAV Wing", 1999, 2 Pages, accessed Feb. 7, 2008 <http://www.ilcdover.com/products/aerospace_defense/uavwings.htm>.
Jones et al., "A High-Altitude Test of Inflatable Wings for Low-Density Flight Applications", 2006, 13 Pages, accessed Feb. 7. 2008 <http://www.ilcdover.com/products/aerospace_defense/uav_techpapers.htm>.
Scarborough et al., "Development of a Finite Element Model of Warping Inflatable Wings", 2006, 19 Pages, accessed Feb. 7, 2008 <http://www.ilcdover.com/products/aerospace_defense/uav_techpapers.htm>.

"Wing Warping," Wikipedia.org, Aug. 2011, 3 Pages, accessed Aug. 24, 2011 <http://en.wikipedia.org/wiki/Wing_Warping>.
USPTO final office action dated Mar. 30, 2011 regarding U.S. Appl. No. 12/042,443, 8 Pages.
USPTO non-final office action dated Nov. 10, 2010 regarding U.S. Appl. No. 12/042,443, 6 Pages.
USPTO notice of allowance dated Jul. 1, 2011 regarding U.S. Appl. No. 12/042,443, 7 Pages.
USPTO non-final office action dated Dec. 30, 2011 regarding U.S. Appl. No. 13/267,614, 10 Pages.
USPTO non-final office action dated Jun. 15, 2012 regarding U.S. Appl. No. 13/267,614, 9 Pages.
Vertigo, Inc., "Inflatable Wings", <http://www.vertigo-inc.com/inflatable_wings/> last visited on Feb. 7, 2008 (See IDS filed Nov. 10, 2010 in U.S. Appl. No. 12/042,443, filed Mar. 5, 2008, in accordance with 35 USC 120).
Lutke et al., "Variable Pitch Airfoils," U.S. Appl. No. 12/633,251, filed Dec. 8, 2009, 45 pages.
Lutke et al., "Non-Reflective Wing," U.S. Appl. No. 12/633,272, filed Dec. 8, 2009, 52 pages.
"Inflatable Wings, Gun Launched Observation Vehicle," Vertigo, Inc., Jun. 2003, 2 Pages, last accessed Feb. 2008 http://web.archive.org/web/20041030234709/http://vertigo-inc.com/Aeronautical_Systems/GLOV/GLOV.html.
Notice of Allowance dated Jul. 9, 2012 regarding U.S. Appl. No. 13/445,708, 10 pages.
Notice of Allowance dated Aug. 27, 2012 regarding U.S. Appl. No. 12/633,251, 17 pages.
"Inflatable Wings," Vertigo Inc., dated on or before Mar. 5, 2008, 3 pages, accessed Oct. 19, 2009 http://www.vertigo-inc.com/inflatable_wings/.
Cadogan et al., "Morphing Inflatable Wing Development for Compact Package Unmanned Aerial Vehicles", 45th AIAA/ASME/ASCE/AHS/ASC Structures, Structural Dynamics & Materials Conference, Apr. 2004, Palm Springs, CA, pp. 1-13.
Simpson et al., "Inflatable and Warpable Wings for Meso-scale UAVs", Infotech@Aerospace, Sep. 2005, Arlington VA, 2005, pp. 1-13.
Cadogan et al., "Recent Development and Test of Inflatable Wings", 47th AIAA/ASME/ASCE/AHS/ASC Structures, Structural Dynamics & Materials Conference, May 2006, Newport RI, pp. 1-15.
Simpson et al., "Aeroelastic Deformation and Buckling of Inflatable Wings under Dynamic Loads", 48th AIAA/ASME/ASCE/AHS/ASC Structures, Structural Dynamics & Materials Conference, Honolulu, Hawaii, Apr. 2007, pp. 1-22.
Jacob et al., "Design of HALE Aircraft Using Inflatable Wings", 46th AIAA Aerospace Sciences Meeting and Exhibit, Jan. 2008, Reno Nevada, pp. 1-16.
Jacob et al., "Design Limitations of Deployable Wings for Small Low Altitude UAVs", 47th AIAA Aerospace Sciences Meeting Including teh New Horizons Forum and Aerospace Exposition, Jan. 2009, Orlando Florida, pp. 1-24.
Norris et al., "Historical Perspective on Inflatable Wing Structures", 50th AIAA/ASME/ASCE/AHS/ASC Structures, Structural Dynamics & Materials Conference, May 2009, Palm Springs, CA, pp. 1-10.
Haight et al., "Hybrid Inflatable/Rigidizable Wings for High Altitude Applications", 50th AIAA/ASME/ASCE/AHS/ASC Structures, Structural Dynamics & Materials Conference, May 2009, Palm Springs, CA, pp. 1-14.
Grant, "The Radar Game, Understanding Stealth and Aircraft Survivability", 1998, IRIS Independent Research, pp. 1-51.
Final office action dated Jan. 18, 2013 regarding U.S. Appl. No. 13/267,614, 27 pages.
Non-final office action dated Feb. 13, 2013 regarding U.S. Appl. No. 12/633,272, 38 pages.
Final Office Action, dated Sep. 5, 2013, regarding U.S. Appl. No. 12/633,272, 23 pages.
Office Action, dated Apr. 30, 2013, regarding U.S. Appl. No. 13/267,614, 11 pages.
Final Office Action, dated Nov. 18, 2013, regarding U.S. Appl. No. 13/267,614, 14 pages.

(56) References Cited

OTHER PUBLICATIONS

Notice of Allowance, dated Dec. 27, 2013, regarding U.S. Appl. No. 12/633,272, 10 pages.

Notice of Allowance, dated Mar. 7, 2014, regarding U.S. Appl. No. 13/267,614, 15 pages.

Notice of Allowance, dated Oct. 24, 2012, regarding U.S. Appl. No. 13/445,708, 21 pages.

* cited by examiner

AIRCRAFT HAVING INFLATABLE FUSELAGE

BACKGROUND INFORMATION

1. Field

The present disclosure relates generally to aircraft and, in particular, to aircraft structures. Still more particularly, the present disclosure relates to a method and apparatus for a fuselage for an aircraft.

2. Background

An unmanned aerial vehicle (UAV) may be an aircraft that may fly without human operators being present in the aircraft. Unmanned aerial vehicles may come in a number of different shapes, sizes, configurations, and/or characteristics. Unmanned aerial vehicles may, for example, without limitation, take the form of fixed wing aircraft and/or helicopters.

Unmanned aerial vehicles may be controlled from a remote location. At this remote location, a human operator or a program executed by a computer may generate commands for the unmanned aerial vehicle. Unmanned aerial vehicles also may be controlled using a program running on a computer or other controller on the unmanned aerial vehicle.

Unmanned aerial vehicles may be used for a number of different purposes. Currently, the largest use may be for military applications. Unmanned aerial vehicles may be used to perform missions that may include, for example, without limitation, reconnaissance missions, attack missions, and/or other suitable types of missions.

Unmanned aerial vehicles also may be used in a number of civilian applications. For example, without limitation, unmanned aerial vehicles may be used to perform surveying, firefighting, and other suitable types of missions.

In some cases, it may be desirable to reduce the footprint or size of an unmanned aerial vehicle prior to its use. For example, without limitation, it may be desirable to pack or stow an unmanned aerial vehicle for launching. The launching of the unmanned aerial vehicle may be by hand, air drop, missile, gun, or other suitable types of delivery system.

In meeting these types of goals for launching and/or transporting unmanned aerial vehicles, inflatable components have been developed. These inflatable components may provide for more compact packaging for stowing, transportation, and/or launching of the unmanned aerial vehicles. Additionally, these inflatable components also may be designed to provide for a desired speed of deployment, while reducing the mass and complexity of the components.

For example, without limitation, wings have been designed using inflatable structures. With inflatable wings, a mechanism for stowing and deploying these types of structures may be present. Further, with inflatable wings, controlled deformations of the wings may be performed using actuation systems that may be located on or within the inflatable wings. These systems may deform and/or otherwise bend the wings to provide the desired amount of lift and/or control of the movement of the unmanned aerial vehicle.

With inflatable wings, durability may be a concern. The durability may involve the ability of inflatable wings to survive when launched by a delivery system, such as a gun or missile. Additionally, the durability of these components also may involve the ability of the components to be reusable over a number deflations and inflations of these components. The durability of these components also may involve the storage of the components in either a packed or inflated state for extended periods of time in extreme and/or unfavorable conditions.

Also, when an unmanned aerial vehicle lands or impacts an object, the survivability of the inflatable components may be desirable. Other durability goals may include, for example, without limitation, the ability of inflatable wings to function as desired with different levels of wind gusts and/or currents.

Accordingly, it would be advantageous to have a method and apparatus which takes into account one or more of the issues discussed above, as well as possibly other issues.

SUMMARY

In one advantageous embodiment, an apparatus may comprise a frame for an aircraft and a number of flexible layers associated with the frame. The number of flexible layers may be configured to define a volume for at least a portion of the aircraft when the number of flexible layers is in an inflated configuration.

In another advantageous embodiment, an unmanned aerial vehicle system may comprise a frame for an unmanned aerial vehicle, a number of flexible layers associated with the frame, a number of components associated with the frame, and an inflation system. The frame may comprise a substantially planar member having a first side, a second side, and a perimeter and a number of members extending from at least one of the first side and the second side of the substantially planar member. A first layer in the number of flexible layers may be on the first side and associated with the perimeter, and a second layer in the number of flexible layers may be on the second side and associated with the perimeter. The perimeter may form an edge for a fuselage in which a first portion of the edge may be a first chine and a second portion of the edge may be a second chine. The number of members may be configured to increase a rigidity of the fuselage. The number of flexible layers may be configured to define a volume for the fuselage of the unmanned aerial vehicle when the number of flexible layers is in an inflated configuration. The number of flexible layers associated with the frame may form an outer mold line for the aircraft in the inflated configuration. The number of flexible layers may have a curable coating that may be configured to become rigid in response to ultraviolet light. The number of components may comprise at least one of a controller, a propulsion unit, a sensor system, a curing system, and an ultraviolet light system. The inflation system may be configured to change the number of flexible layers from an uninflated configuration to the inflated configuration.

In yet another advantageous embodiment, a method for deploying an aircraft may be present. An inflation system may be activated to generate a gas. A fuselage of the aircraft may be inflated with the gas. The fuselage may comprise a frame for the aircraft and a number of flexible layers associated with the frame in which the number of flexible layers may be configured to define a volume for at least a portion of the aircraft when the number of flexible layers may be in an inflated configuration.

In still yet another advantageous embodiment, a method may be present for deploying an unmanned aerial vehicle system. An inflation system may be activated to generate a gas. A fuselage of the aircraft may be inflated with the gas. The fuselage may comprise a frame for the unmanned aerial vehicle and a number of flexible layers associated with the frame. The frame may comprise an elongate member having a first side, a second side, a perimeter, and a number of members. The perimeter may form an edge for the fuselage. A first layer in a number of flexible layers may be on the first side and associated with the perimeter, and a second layer in the number of flexible layers may be on the second side and associated with perimeter. A number of systems may be associated with the elongate member. The number of members may extend from at least one of the first side and the second side of the elongate member. The number of members may be configured to increase a rigidity of the fuselage. The number of flexible layers may be configured to define a volume for the fuselage of the unmanned aerial vehicle when the number of flexible layers is in an inflated configuration. The number of flexible layers associated with the frame may form an outer mold line for the aircraft in the inflated configuration. A curable coating may be cured on the number of flexible layers after the number of flexible layers may be in the inflated configuration using an ultraviolet light system located in the fuselage.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
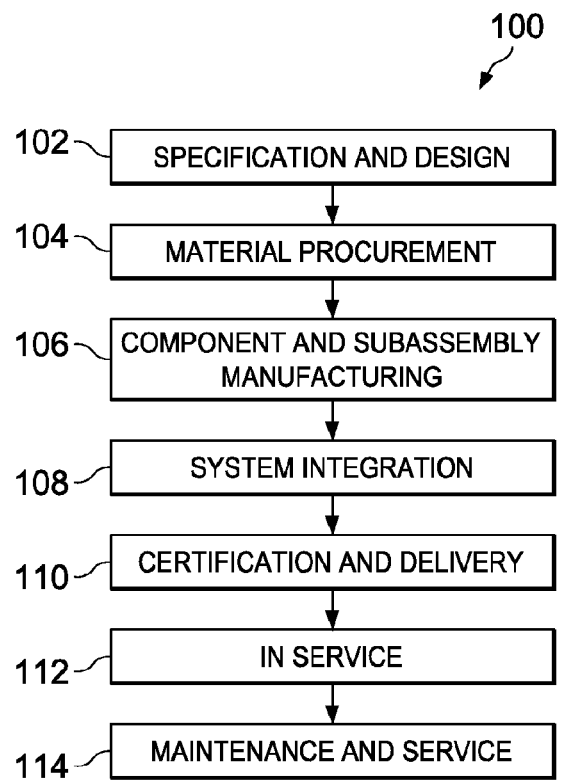
FIG. 1 is an illustration of an aircraft manufacturing and service method in accordance with an advantageous embodiment.
Figure 2:
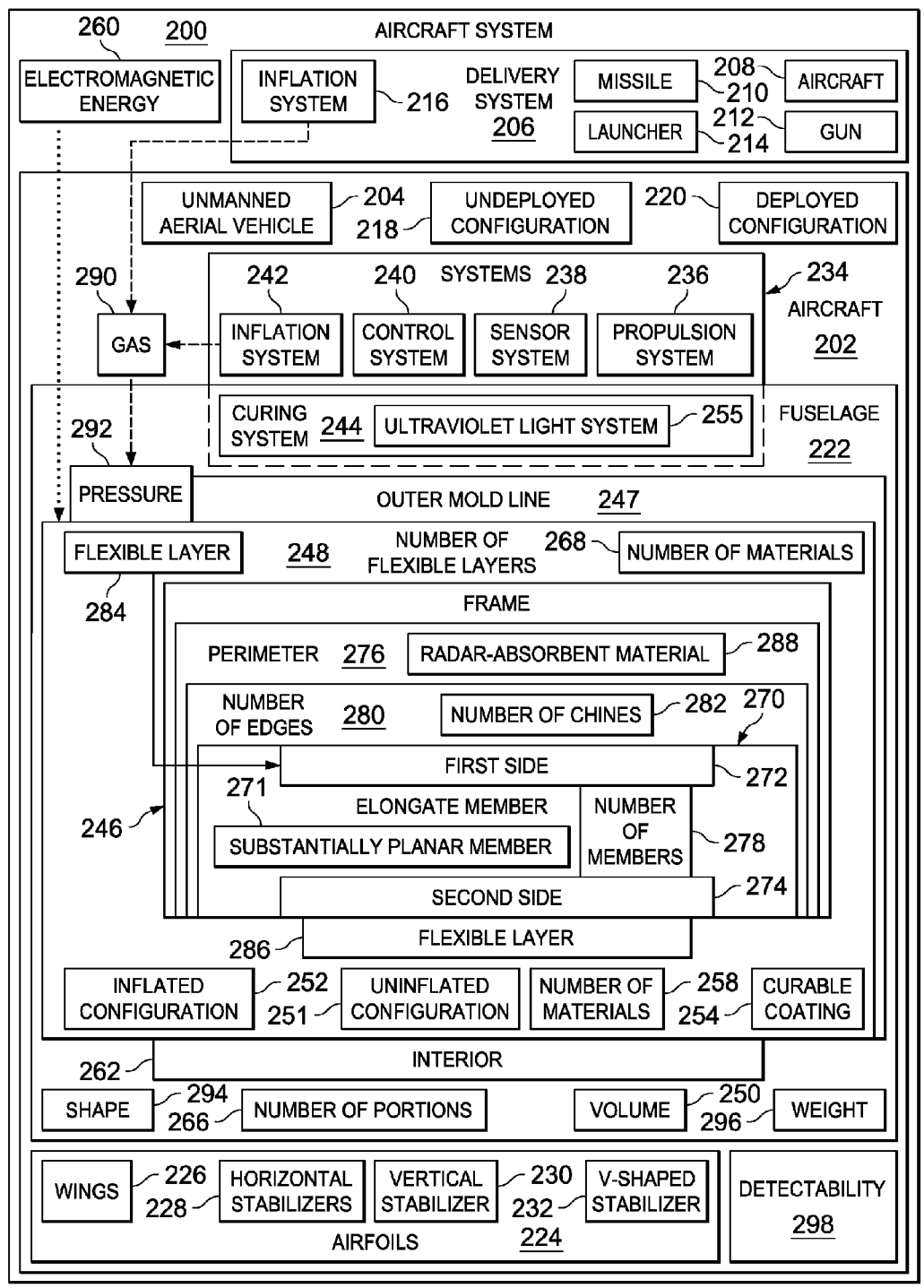
FIG. 2 is an illustration of an aircraft system in accordance with an advantageous embodiment.

Referring more particularly to the drawings, embodiments of the disclosure may be described in the context of aircraft manufacturing and service method 100 as shown in FIG. 1 and aircraft 202 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 202 in FIG. 2 and material procurement 104.

During production, component and subassembly manufacturing 106 and system integration 108 of aircraft 202 in FIG. 2 takes place. Thereafter, aircraft 202 in FIG. 2 may go through certification and delivery 110 in order to be placed in service 112. While in service by a customer, aircraft 202 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 202 in FIG. 2 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items means, one or more items. For example, without limitation, a number of apparatus embodiments may be one or more apparatus embodiments. A number of apparatus embodiments, method embodiments, or a combination thereof may be utilized while aircraft 202 in FIG. 2 is in service 112 and/or during maintenance and service 114 in FIG. 1. The use of a number of the different advantageous embodiments may substantially expedite the assembly of and/or reduce the cost of aircraft 202 in FIG. 2.

The different advantageous embodiments recognize and take into account a number of different considerations. For example, without limitation, the different advantageous embodiments recognize and take into account that in reducing the volume taken up by an aircraft, inflatable components may be used. Currently, these inflatable components take the form of wings and stabilizers. The different advantageous embodiments also recognize and take into account that the use of inflatable wings, stabilizers, and other types of airfoils may not provide the desired amount of reduction in volume for an aircraft.

Further, the different advantageous embodiments recognize and take into account that a fuselage may have discontinuities in the curved shape of the fuselage such as, for example, without limitation, seams, gaps, and/or other types of discontinuities. These discontinuities may increase radar reflectivity. For example, without limitation, electromagnetic waves may scatter off of the discontinuities in the fuselage, allowing the aircraft to be detected by a radar receiver. The different advantageous embodiments recognize and take into account that a fuselage with inflatable components may have a continuously curved shape that may allow the fuselage to be undetectable by some radar systems.

Thus, the different advantageous embodiments provide an apparatus comprising a frame and a plurality of flexible layers. The frame may be for an aircraft. The plurality of flexible layers may be associated with the frame. The plurality of flexible layers may be configured to define a volume for a fuselage of the aircraft when the plurality of flexible layers is in an inflated configuration.

With reference now to FIG. 2, an illustration of an aircraft system is depicted in accordance with an advantageous embodiment. Aircraft system 200 may include aircraft 202. Aircraft 202 may be, for example, without limitation, unmanned aerial vehicle 204.

Unmanned aerial vehicle 204 may be produced by aircraft manufacturing and service method 100 in FIG. 1. Unmanned aerial vehicle 204 may be transported and/or launched using delivery system 206. Delivery system 206 also may be manufactured as part of aircraft system 200 for unmanned aerial vehicle 204 using aircraft manufacturing and service method 100 in FIG. 1. In these illustrative examples, delivery system 206 may include at least one of aircraft 208, missile 210, gun 212, launcher 214, and/or other suitable delivery systems. Further, delivery system 206 also may include inflation system 216.

Aircraft 202 may be in undeployed configuration 218 for storage and/or delivery by delivery system 206. When deployed or launched by delivery system 206, aircraft 202 may change into deployed configuration 220. Changing aircraft 202 from undeployed configuration 218 to deployed configuration 220 may be performed using inflation system 216.

As illustrated, aircraft 208 may have fuselage 222 and airfoils 224. In these illustrative examples, an airfoil is a device or structure configured to provide at least one of lift for an aircraft and control an aircraft during flight. For example, without limitation, an airfoil may be a wing for an aircraft, a control surface, or some other suitable type of structure. A control surface may be, for example, without limitation, a horizontal stabilizer, a vertical stabilizer, or some other suitable structure.

For example, without limitation, airfoils 224 may take the form of wings 226, horizontal stabilizers 228, vertical stabilizer 230, V-shaped stabilizer 232, and/or other suitable types of airfoils or control surfaces. In these illustrative examples, fuselage 222 is a structure for which airfoils 224 may be fixed or moveably attached.

In these illustrative examples, aircraft 202 may include systems 234. Systems 234 may comprise, for example, without limitation, propulsion system 236, sensor system 238, control system 240, inflation system 242, curing system 244, and other suitable types of systems.

In these illustrative examples, fuselage 222 may include frame 246 and number of flexible layers 248. Number of flexible layers 248 may be associated with frame 246. Number of flexible layers 248 may be configured to define volume 250 for fuselage 222 of aircraft 202 when number of flexible layers 248 is in inflated configuration 252. Further, number of flexible layers 248 associated with frame 246 may form outer mold line 247 for aircraft 202 when aircraft 202 is in inflated configuration 252.

Inflation system 216 and/or inflation system 242 may be used to change number of flexible layers 248 between uninflated configuration 251 and inflated configuration 252. In some advantageous embodiments, inflation system 216 may inflate number of flexible layers 248 to inflated configuration 252.

For example, without limitation, number of flexible layers 248 may have curable coating 254. Curable coating 254 may change from a flexible state to a rigid state using curing system 244. In other words, curable coating 254 may be cured using curing system 244 to become rigid. As a result, number of flexible layers 248 also may become rigid. In these illustrative examples, curing system 244 may be, for example, without limitation, ultraviolet light system 255.

Ultraviolet light system 255 may generate ultraviolet light that causes curable coating 254 to become rigid. Ultraviolet light system 255 may be located inside fuselage 222, in the flexible material layers making up the inflatable structures, and/or in some other suitable location. In some advantageous embodiments, curable coating 254 may be a layer on number of flexible layers 248. In other advantageous embodiments, curable coating 254 may be fused and/or integrated within number of flexible layers 248.

Curing system 244 may be located inside fuselage 222 and associated with frame 246. In yet other advantageous embodiments, curing system 244 may be unnecessary. For example, without limitation, curable coating 254 may be cured by ultraviolet light from a natural source, such as the sun. In other advantageous embodiments, curable coating 254 may be cured by, for example, without limitation, heating curable coating 254, using a chemical reaction, and/or performing some suitable form of curing. Curing system 244 may be, for example, without limitation, a heater or a chemical applicator system.

In these illustrative examples, number of flexible layers 248 may be comprised of number of materials 258. Number of materials 258 may be, for example, without limitation, at least one of polyurethane, a polyester film, a para-aramid synthetic fiber with an airtight liner, nylon with an airtight liner, a cloth with a wire mesh and an airtight liner, vinyl, or any other suitable type of material. Number of materials 258 may be selected to be radar invisible.

The different advantageous embodiments recognize and take into account that currently available fuselages may have a shape that may increase the detectability of the aircraft by detection systems, such as a radar system. This shape may be a discontinuous curved shape. The different advantageous embodiments recognize and take into account that electromagnetic waves, such as those used in radar systems, typically reflect off gaps or and curves with radiuses less than a selected value. These types of gaps and/or curves may be found in objects, such as a fuselage, at seams, joints, and/or other portions of the objects. For example, without limitation, an edge at a seam may have a curved shape with a radius such that electromagnetic waves may scatter off of the edge.

In these illustrative examples, number of materials 258 may be selected such that electromagnetic energy 260 may not penetrate number of flexible layers 248 and enter interior 262 of fuselage 222. Number of materials 258 also may include, for example, without limitation, polyethylene, polyvinyl, and nylon with a coating. These particular materials may be used with a metal film layer, metal deposition layer or other conductive coating.

In some advantageous embodiments, number of portions 266 may be transparent for sensor system 238. The transparency may be for selected wavelengths, such as visible light and/or infrared energy. For example, without limitation, sensor system 238 may include an optical package and/or a camera, which may be positioned with respect to number of portions 266 to obtain images of objects outside of fuselage 222.

In these illustrative examples, frame 246 may be comprised of number of materials 268. For example, without limitation, number of materials 268 may include, for example, without limitation, a composite material, aluminum, titanium, a metal alloy, a plastic, and/or some other suitable material. Number of materials 268 may be selected such that frame 246 may provide a desired amount of rigidity and durability for aircraft 202.

In some advantageous embodiments, frame 246 may be elongate member 270. In these examples, elongate member 270 may take the form of substantially planar member 271. Elongate member 270 may have first side 272 and second side 274. Elongate member 270 also may have perimeter 276. First side 272 may be substantially parallel to second side 274.

Additionally, frame 246 also may include number of members 278. Number of members 278 may extend from at least one of first side 272 and second side 274 of elongate member 270. Number of members 278 may be configured to increase a rigidity of elongate member 270. In other words, number of members 278 may act as stiffeners for elongate member 270. Number of members 278 may contact or support some or all of number of flexible layers 248 in these illustrative examples. Contact between number of members 278 and flexible layers 248 may allow fuselage 222 to take the form of a more complex shape that possible without the use of number of members 278.

In these illustrative examples, number of flexible layers 248 may meet and be associated with perimeter 276. In the illustrative examples, number of members 278 may be comprised of number of materials 268. Number of members 278 may use the same materials in number of materials 268 as used with elongate member 270 or may use different materials.

In these illustrative examples, perimeter 276 may form number of edges 280. Number of edges 280 may be configured to prevent electromagnetic energy 260 directed at first side 272 from reaching second side 274. In a similar manner, electromagnetic energy 260 directed at second side 274 may be prevented from reaching first side 272 by number of edges 280. In these illustrative examples, number of edges 280 may form number of chines 282. Number of chines 282 may be comprised of a number of materials and/or have a geometry selected to reduce radar reflection by number of chines 282.

In one illustrative example, flexible layer 284 may cover first side 272 and may be associated with perimeter 276. Flexible layer 286 may cover second side 274 of elongate member 270 and may be associated with perimeter 276.

Perimeter 276 may be coated with radar-absorbent material 288. Radar-absorbent material 288 may reduce reflectivity of electromagnetic energy 260.

In these illustrative examples, gas 290 may be used to inflate number of flexible layers 248. Gas 290 may be supplied from at least one of inflation system 216 and inflation system 242. Gas 290 may only need to exert pressure 292 on number of flexible layers 248 to maintain shape 294 for fuselage 222.

Of course, when curable coating 254 is used, gas 290 may be unnecessary after curing of curable coating 254. Gas 290 may take various forms. For example, without limitation, gas 290 may be at least one of air, helium, nitrogen, and/or some other suitable gas. Additionally, gas 290 may be a mixture of different types of gases.

In this manner, fuselage 222 may be configured such that fuselage 222 in uninflated configuration 251 may take up less space in delivery system 206. Further, in the different advantageous embodiments, this type of configuration for fuselage 222 also may reduce weight 296. Further, with the use of number of flexible layers 248 inflated to inflated configuration 252, detectability 298 of aircraft 202 also may be reduced. In other words, detectability 298 of aircraft 202 by detection systems may be reduced. Still more specifically, detectability 298 of aircraft 202 by radar detection systems using electromagnetic energy 260 may be reduced.

The illustration of aircraft system 200 in FIG. 2 is not meant to imply physical or architectural limitations to the manner in which advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, airfoils 224 may be inflatable in addition to fuselage 222. Additionally, in some advantageous embodiments, substantially planar member 271 may not be a solid substantially planar member. Instead, substantially planar member 271 may have holes or channels extending from side to side. In yet other advantageous embodiments, elongate member 270 may be formed from multiple members joined to each other to form substantially planar member 271. In yet other advantageous embodiments, elongate member 270 may have a non-planar surface or shape. For example, without limitation, a first side of fuselage 222 may be inflatable, while elongate member 270 may form a second side of fuselage 222 and shape 294 of fuselage 222.

Figure 3:
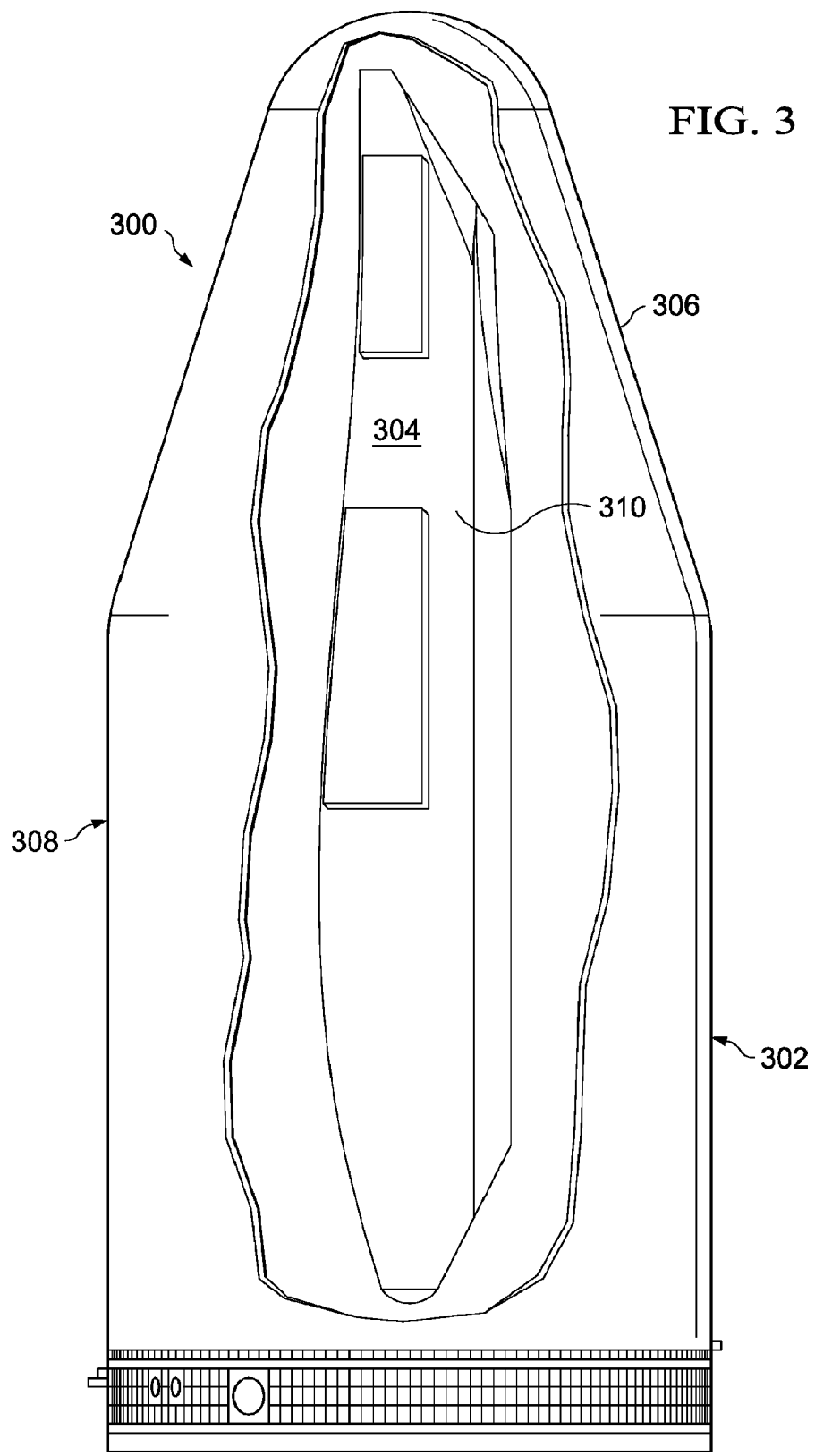
FIG. 3 is an illustration of an aircraft system in accordance with an advantageous embodiment.

With reference now to FIG. 3, an illustration of an aircraft system is depicted in accordance with an advantageous embodiment. In this illustrative example, aircraft system 300 is an example of one implementation for aircraft system 200 in FIG. 2.

In this example, aircraft system 300 is shown in a partially exposed view. Aircraft system 300 may include, for example, without limitation, delivery system 302 and aircraft 304. In this depicted example, delivery system 302 may be missile 306. In FIG. 3, payload section 308 of missile 306 is illustrated with aircraft 304. Aircraft 304, in this example, may be unmanned aerial vehicle 310.

Figure 4:
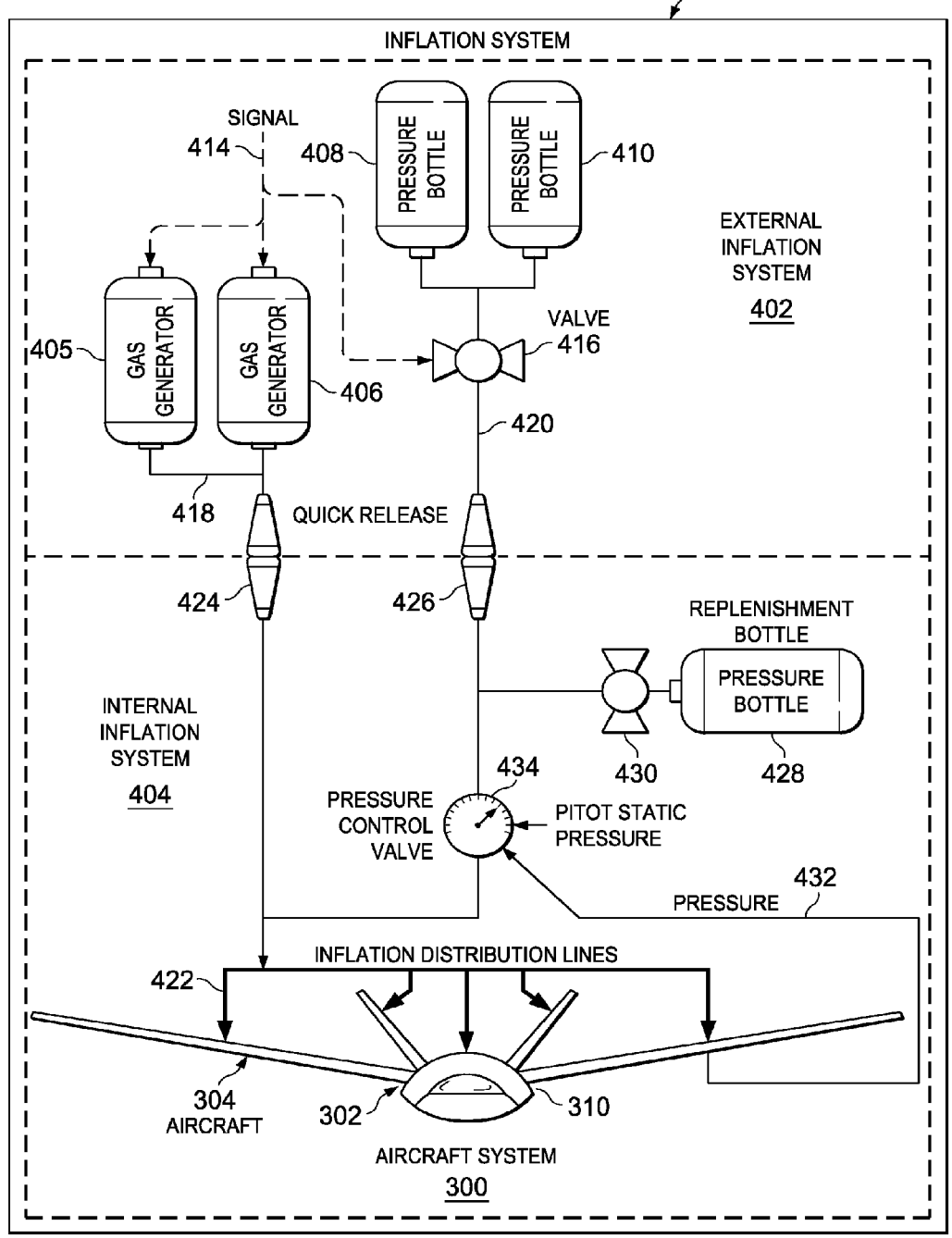
FIG. 4 is an illustration of an inflation system for an aircraft in accordance with an advantageous embodiment.

Turning now to FIG. 4, an illustration of an inflation system for an aircraft is depicted in accordance with an advantageous embodiment. Inflation system 400 is an example of one implementation of inflation system 216 and inflation system 242 in FIG. 2.

Inflation system 400 may be used to inflate components in unmanned aerial vehicle 310. In this illustrative example, inflation system 400 includes external inflation system 402, and internal inflation system 404. External inflation system 402 may be located in delivery system 302 in these examples. Internal inflation system 404 may be located within aircraft 304. In this illustrative example, external inflation system 402 is an example of one implementation for inflation system 216 in FIG. 2. Internal inflation system 404 may be an example of one physical implementation for inflation system 242 in FIG. 2.

As illustrated, external inflation system 402 may include, for example, without limitation, a number of different sources of gas. In these examples, external inflation system 402 may include gas generator 405, gas generator 406, pressure bottle 408, and pressure bottle 410.

Gas generator 405 and gas generator 406 may generate gas in a number of different ways. For example, without limitation, these gases may be produced by burning a chemical similar to rocket propellant. Additionally, in some advantageous embodiments, gas generator 405 and gas generator 406 may be an engine in the delivery system that generates gases during operation.

In these illustrative examples, pressure bottle 408 and pressure bottle 410 may store gas in a compressed form. In these illustrative examples, pressure bottle 408 and pressure bottle 410 may store gasses such as, for example, without limitation, air, nitrogen, helium, and/or other suitable gasses. Gas generator 405 and gas generator 406 may generate gasses with a warmer temperature as compared to gasses in pressure bottle 408 and pressure bottle 410.

In these illustrative examples, signal 414 may be used to cause gas generators 405 and 406 to create gas. Signal 414 also may control valve 416 to deliver gas from pressure bottle 408 and pressure bottle 410. In these depicted examples, gas lines 418 and 420 may connect to inflation distribution lines 422 for aircraft 304. Quick release mechanisms 424 and 426 may allow for external inflation system 402 to detach from internal inflation system 404.

In these illustrative examples, internal inflation system 404 may include pressure bottle 428. Pressure bottle 428 may include gasses similar to those in pressure bottles 408 and 410. Gas may be released from pressure bottle 428 through the control of valve 430.

Pressure 432 for aircraft 304 may be controlled using pressure control valve 434. If pressure 432 increases beyond the desired level, pressure control valve 434 may release gas from aircraft 304. If pressure 432 decrease below a desired level, valve 430 may be operated to introduce gas from pressure bottle 428 into aircraft 304.

The illustration of inflation system 400 in FIG. 4 is not meant to imply physical or architectural limitations to the manner in which other inflation systems may be implemented for use within an aircraft. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, external inflation system 402 may only use one of pressure bottles or gas generators instead of both, as illustrated in FIG. 4. In yet other advantageous embodiments, a gas generator or a compressor may replace pressure bottle 428 in internal inflation system 404. In another embodiment, additional numbers of pressure control valves and inflation distribution lines may be added to allow the different components to be operated at different pressures. In still other advantageous embodiments, other types of mechanisms may be used in addition to or in place of the ones shown for controlling the pressure in aircraft 304.

Figure 5:
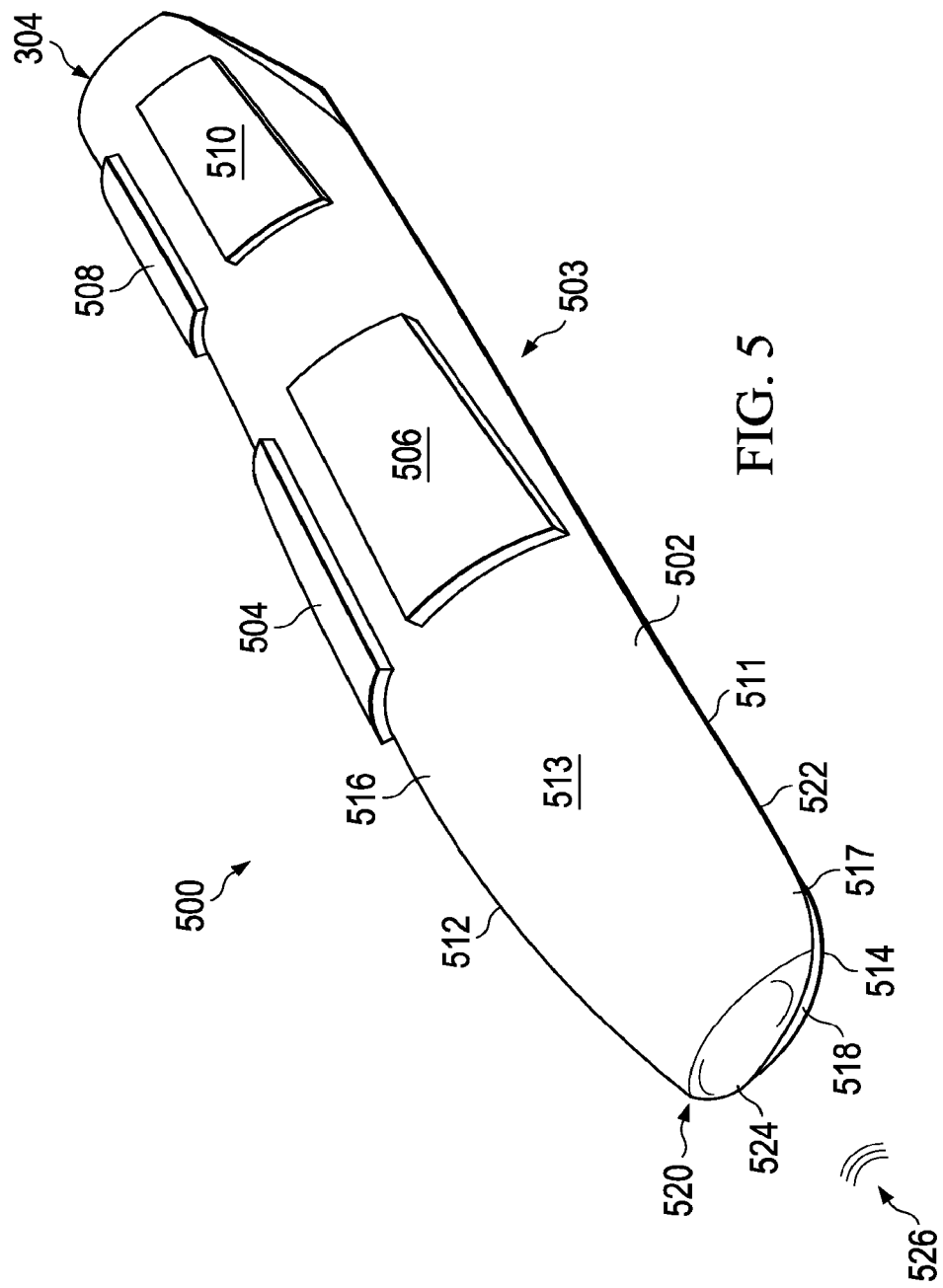
FIG. 5 is an illustration of an aircraft in an undeployed configuration in accordance with an advantageous embodiment.

With reference now to FIG. 5, an illustration of an aircraft in an undeployed configuration is depicted in accordance with an advantageous embodiment. In this illustrative example, aircraft 304 is shown in undeployed configuration 500. Aircraft 304, in this example, may have fuselage 502 and airfoils 503. As illustrated, airfoils 503 may include wing 504, wing 506, stabilizer 508, and stabilizer 510.

In these illustrative examples, fuselage 502 is an example of an implementation of fuselage 222 in FIG. 2. In this example, fuselage 502 may be in uninflated configuration 511. Fuselage 502 may include side 512 and side 514. In this example, side 512 may be formed by flexible layer 513 and may have surface 516. Side 514 may be formed by flexible layer 517 and may have surface 518.

Flexible layer 513 and flexible layer 517 may meet at edge 520. Edge 520 may take the form of chine 522 and chine 524. In these illustrative examples, edge 520 may have a shape that reduces and/or prevents electromagnetic energy 526 directed at side 514 from reaching side 512.

As depicted, when fuselage 502 is in uninflated configuration 511, fuselage 502 may take up less space. As a result, aircraft 304 may be easier to transport and/or deploy in this configuration.

Figure 6:
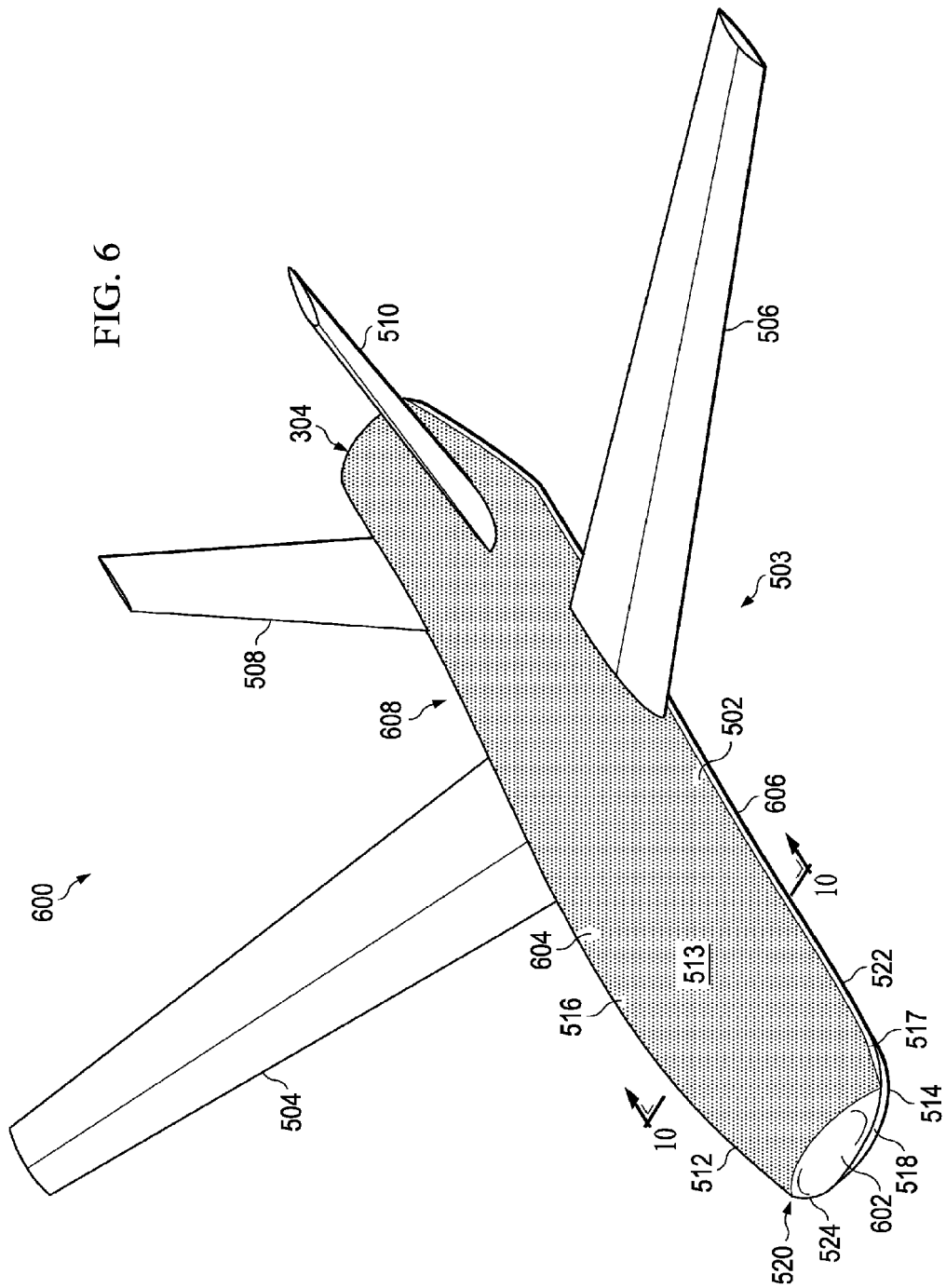
FIG. 6 is an illustration of an aircraft in a deployed configuration in accordance with an advantageous embodiment.

Turning next to FIG. 6, an illustration of an aircraft in a deployed configuration is depicted in accordance with an advantageous embodiment. In this illustrative example, a perspective view of aircraft 304 is shown in deployed configuration 600. In deployed configuration 600, section 602 and section 604 of fuselage 502 may be in inflated configuration 606. Further, aircraft 304 may have outer mold line 608 in inflated configuration 606 in this illustrative example.

Figure 7:
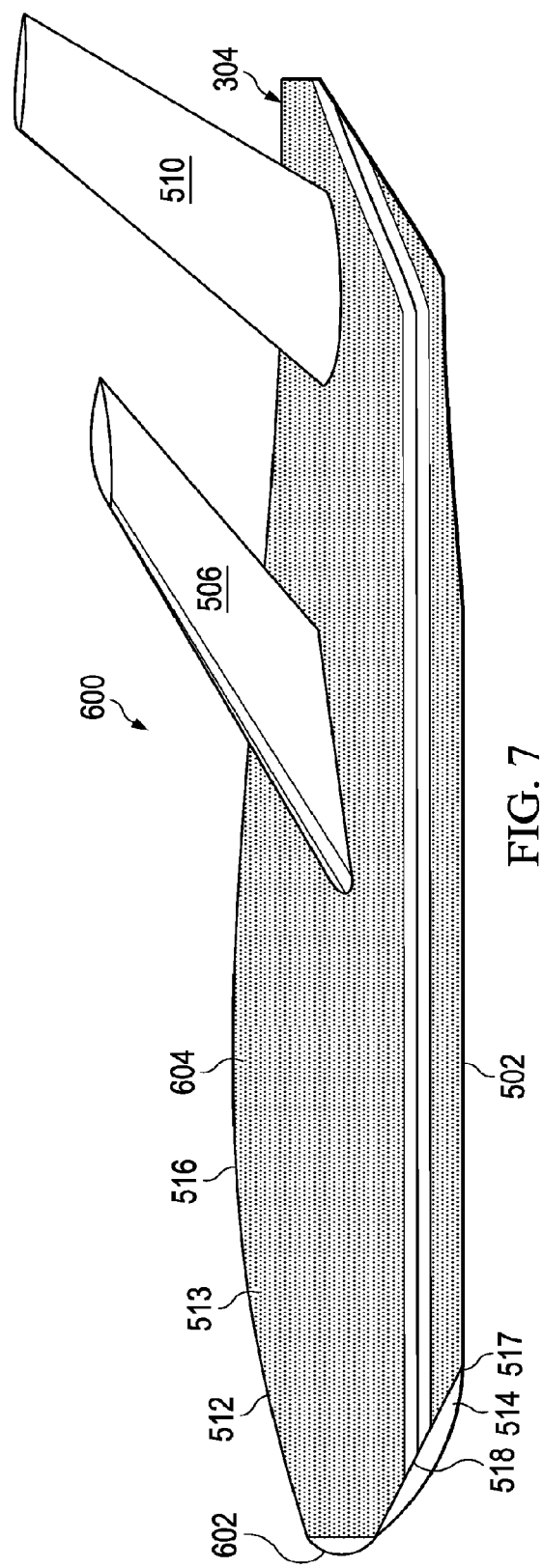
FIG. 7 is an illustration of an aircraft in a deployed configuration in accordance with an advantageous embodiment.

Turning now to FIG. 7, an illustration of an aircraft in a deployed configuration is depicted in accordance with an advantageous embodiment. In this illustration, a better view of side 514 of aircraft 304 may be seen.

Figure 8:
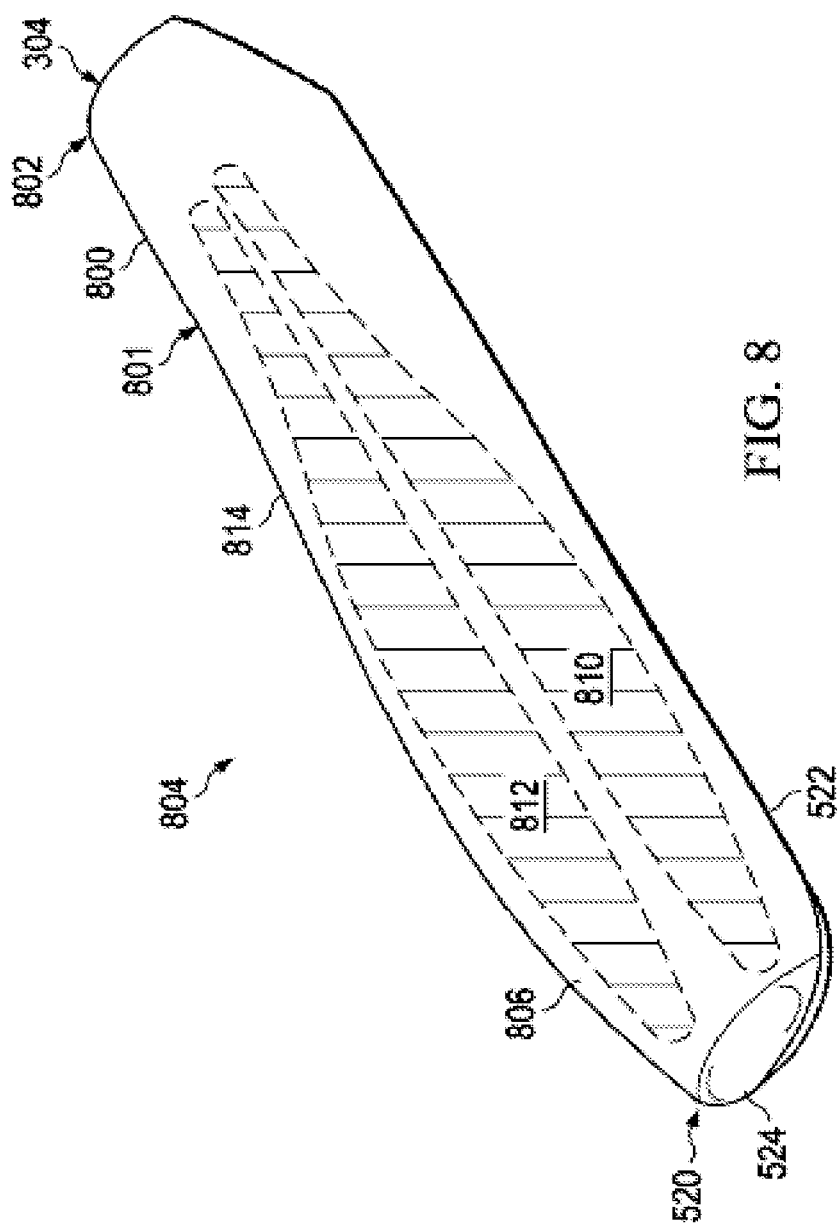
FIG. 8 is an illustration of a frame of a fuselage in accordance with an advantageous embodiment.

Turning now to FIG. 8, an illustration of a frame of a fuselage is depicted in accordance with an advantageous embodiment. In this illustrative example, frame 800 is an example of one physical implementation for frame 246 in FIG. 2. Frame 800 may be used in fuselage 502 in FIG. 5. As illustrated, frame 800 comprises elongate member 801 and number of members 804. In these examples, elongate member 801 may be substantially planar member 802. Substantially planar member 802 may have side 806.

As illustrated, number of members 804 includes member 810 and member 812 that may be on side 806 of substantially planar member 802. These members are shown in phantom, because they may be unnecessary or unneeded, depending on the particular implementation. In some advantageous embodiments, only substantially planar member 802 may be present for frame 800. In this illustrative example, substantially planar member 802 may have perimeter 814. Perimeter 814 may form or be part of edge 520 for aircraft 304. Edge 520 may include chine 522 and chine 524.

Number of members 804 may provide additional rigidity for frame 800, depending on the particular implementation. Also, in some advantageous embodiments, number of members 804 may fold or be moved using an actuator system when placing an aircraft into a deployed configuration. Additional members may be present on a side opposite to, but not shown in this view, in addition to side 806.

Figure 9:
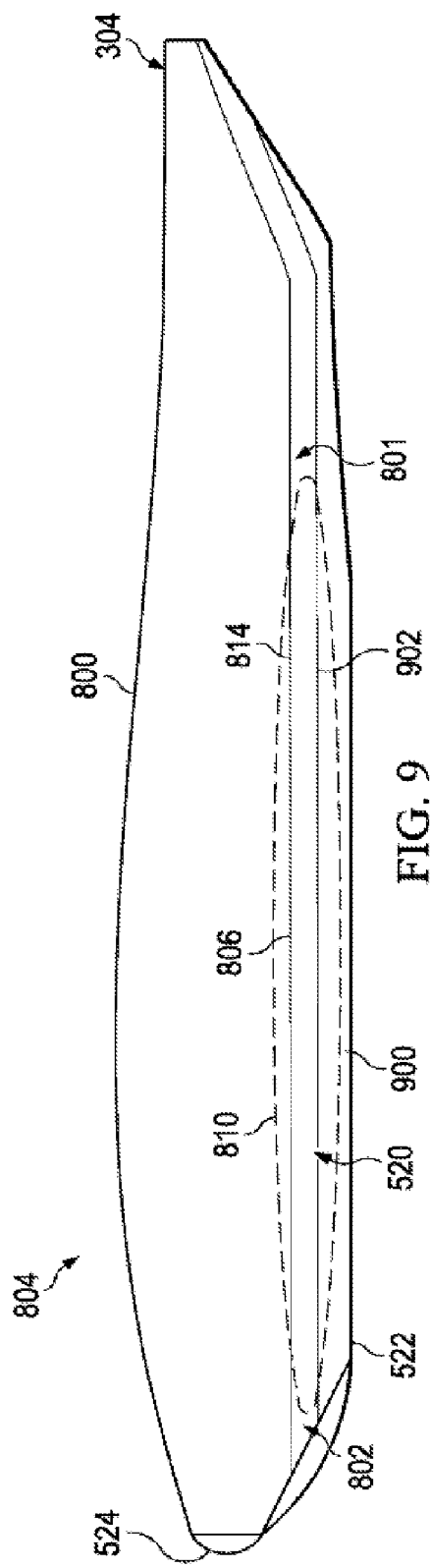
FIG. 9 is an illustration of a side view of a frame of a fuselage in accordance with an advantageous embodiment.

Turning now to FIG. 9, an illustration of a side view of a frame of a fuselage is depicted in accordance with an advantageous embodiment. In this illustrative example, member 900 in number of members 804 may extend from side 902 of substantially planar member 802.

Figure 10:
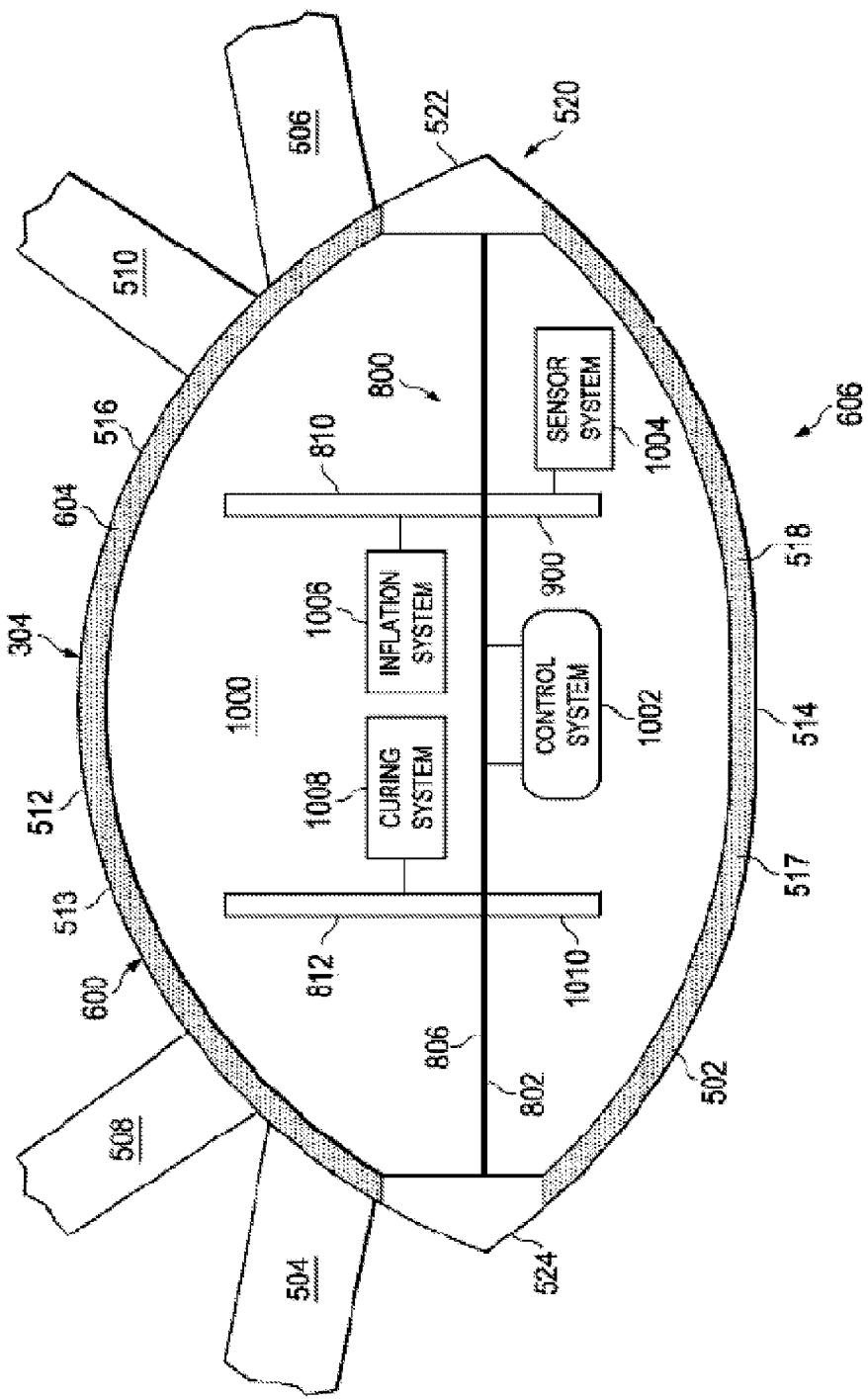
FIG. 10 is an illustration of a cross-section of a fuselage in accordance with an advantageous embodiment.

With reference now to FIG. 10, an illustration of a cross-section of a fuselage is depicted in accordance with an advantageous embodiment. In this illustrative example, a cross-section of fuselage 522 is illustrated as taken along lines 10-10 in FIG. 6. As depicted, frame 800 may be associated with systems 1000. These systems may include, for example, without limitation, control system 1002, sensor system 1004, inflation system 1006, curing system 1008, and/or other suitable types of systems. Although these examples illustrate systems 1000 as being attached to substantially planar member 802, one or more of systems 1000 may be attached to at least one of members 810, 812, 900, and 1010.

In other advantageous embodiments, curing system 1008 may be a system located remote to or outside of aircraft 304. For example, without limitation, curing system 1008 may be a heater or a chemical applicator system located remote to aircraft 304. In yet other advantageous embodiments, sunlight may be used in addition to or in the place of curing system 1008.

Figure 11:
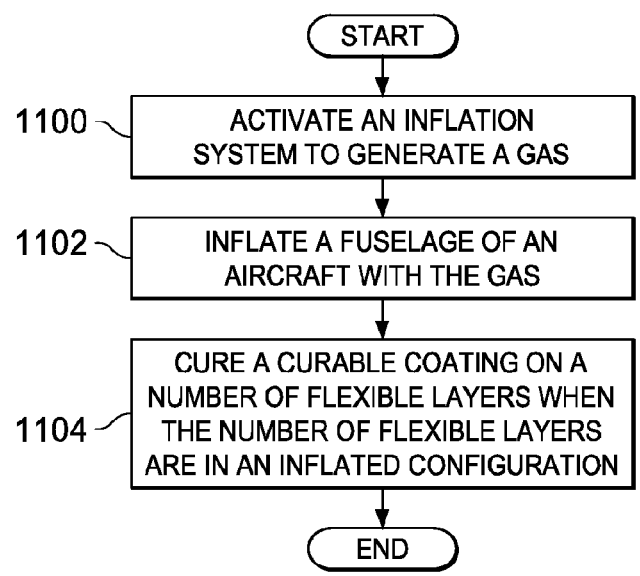
FIG. 11 is an illustration of a flowchart for deploying an aircraft in accordance with an advantageous embodiment.

With reference now to FIG. 11, an illustration of a flowchart for deploying an aircraft is depicted in accordance with an advantageous embodiment. The process illustrated in FIG. 11 may be implemented in aircraft system 200 in FIG. 2. In particular, this process may be implemented using fuselage 222 for aircraft 202 in FIG. 2.

In this illustrative example, the process may begin by activating inflation system 216 to generate gas 290 (operation 1100). Fuselage 222 of aircraft 202 may be inflated with gas 290 (operation 1102). In these examples, fuselage 222 may comprise frame 246 and number of flexible layers 248. Number of flexible layers 248 may be configured to define volume 250 for fuselage 222 when number of flexible layers 248 is in inflated configuration 252. Thereafter, the process may cure curable coating 254 on number of flexible layers 248 when number of flexible layers 248 are in inflated configuration 252 (operation 1104), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for an aircraft with an inflatable fuselage. In one advantageous embodiment, the fuselage may comprise a frame for an aircraft and a number of flexible layers associated with the frame. The number of flexible layers may be configured to define a volume for a fuselage of the aircraft when the number of flexible layers is in an inflated configuration.

With one or more of the different advantageous embodiments, an amount of space or room occupied by an aircraft may be reduced. By having a fuselage which may have an uninflated configuration when the aircraft is in an undeployed configuration, the different advantageous embodiments may allow for easier transport or delivery of an aircraft through various delivery systems. Further, with the different advantageous embodiments, the use of a number of flexible layers for the outer surface or fuselage of the aircraft may reduce the detectability of the aircraft with respect to detection systems, such as a radar system. This detectability may be reduced through materials used in the number of flexible layers.

Additionally, by using a number of flexible layers, a number of seams, edges, or other discontinuities that may cause reflection of electromagnetic energy from a radar system may be reduced. Further, the number of flexible layers may have a substantially continuously curved shape.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a frame for an aircraft, the frame comprising:
   an elongate member having
      a first side,
      a second side, and
      a perimeter,
   the frame running a full length of a fuselage of the aircraft and the perimeter forming an edge for the fuselage of the aircraft,
   wherein a first portion of the edge is formed by a first chine member, and
   wherein a second portion of the edge is formed by a second chine member;
a number of flexible layers associated with the frame in which the number of flexible layers is configured to define a volume for a fuselage of the aircraft when the number of flexible layers is in an inflated configuration;
an inflation system configured to change the number of flexible layers from an uninflated configuration to the inflated configuration; and
a delivery system comprising the inflation system and at least one of a second aircraft different from the aircraft, a missile, a gun, and a launcher,
wherein the inflation system is configured to inflate the aircraft when the at least one of the second aircraft different from the aircraft, the missile, the gun, and the launcher launches the aircraft.

2. The apparatus of claim 1, wherein the number of flexible layers associated with the frame form an outer mold line for the aircraft in the inflated configuration.

3. The apparatus of claim 1, wherein a first flexible layer in the number of flexible layers covers the first side and is associated with the perimeter and wherein a second flexible layer in the number of flexible layers covers the second side and is associated with the perimeter.

4. The apparatus of claim 3, wherein the first side is an upper side for the aircraft and the second side is a lower side for the aircraft.

5. The apparatus of claim 4 wherein the frame further comprises:
a number of members extending perpendicularly from at least one of the upper side and the lower side of the elongate member in which the number of members is configured to increase a rigidity of the fuselage of the aircraft.

6. The apparatus of claim 5, further comprising:
a number of systems attached to at least one of the number of members.

7. The apparatus of claim 5, wherein:
the number of members are configured to contact the elongate member
the number of members are configured to contact the number of flexible layers, forming contacts; and
the contacts are configured to allow the fuselage to have a more complex shape than possible without the contacts.

8. The apparatus of claim 5, wherein:
the number of members extend vertically from the at least one of the first side and the second side of the elongate member.

9. The apparatus of claim 4, wherein the elongate member is a substantially planar member running the full length of the fuselage of the aircraft, forming a plane that is solid except for at least one of holes extending from the upper side to the lower side or channels extending from the upper side to the lower side.

10. The apparatus of claim 3, further comprising:
a number of members comprising a first plurality of members extending perpendicularly from the first side of the elongate member and away from the second side of the elongate member and a second plurality of members extending perpendicularly from the second side of the elongate member and away from the first side of the elongate member; and
a number of systems comprising a first number of systems attached to at least one member in the first plurality of members and a second number of systems attached to at least one member in the second plurality of members, wherein the number of systems comprises at least one of a controller, a propulsion unit, a sensor system, a curing system, and an inflation system.

11. The apparatus of claim 3, wherein an upper side of the fuselage is formed by the first flexible layer and a lower side of the fuselage is formed by the second flexible layer while the aircraft is in an undeployed configuration.

12. The apparatus of claim 1, wherein the number of flexible layers is comprised of a material selected from one of polyester film, plastic, nylon with a first airtight liner, a cloth with a wire mesh and a second airtight liner, and vinyl.

13. The apparatus of claim 1 further comprising:
a propulsion system configured to move the aircraft during flight.

14. The apparatus of claim 1, wherein the aircraft is an unmanned aerial vehicle.

15. The apparatus of claim 1, wherein a number of airfoils are associated with the fuselage.

16. The apparatus of claim 15, wherein the number of flexible layers comprise the number of airfoils, and the number of airfoils are inflatable.

17. An apparatus comprising:
a frame for an aircraft, the frame comprising:
an elongate member having
a first side,
a second side, and
a perimeter,
the frame running a full length of a fuselage of the aircraft and the perimeter forming an edge for the fuselage of the aircraft,
wherein a first portion of the edge is formed by a first chine member,
wherein a second portion of the edge is formed by a second chine member,
wherein the first portion of the edge is a first pentagonal-shaped member forming the first chine member and the second portion of the edge is a second pentagonal-shaped member forming the second chine member,
wherein the first chine member and the second chine member are connected to a substantially planar member, and
wherein the first pentagonal-shaped member and the second pentagonal-shaped member are configured to prevent radio waves directed at the first side of the elongate member from reaching the second side of the elongate member; and
a number of flexible layers associated with the frame in which the number of flexible layers is configured to define a volume for a fuselage of the aircraft when the number of flexible layers is in an inflated configuration.

18. The apparatus of claim 17, wherein the first chine and the second chine are configured to reduce radar reflection by selection of at least one of a number of materials and a geometry of the first chine and the second chine.

19. The apparatus of claim 17 further comprising:
an inflation system configured to change the number of flexible layers from an uninflated configuration to the inflated configuration; and
a delivery system comprising the inflation system and at least one of a second aircraft different from the aircraft, a missile, a gun, and a launcher,
wherein the inflation system is configured to inflate the aircraft when the at least one of the second aircraft different from the aircraft, the missile, the gun, and the launcher launches the aircraft.

20. An unmanned aerial vehicle system comprising:
a frame for an unmanned aerial vehicle in which the frame comprises:
a substantially planar member having
a first side,
a second side, and
a perimeter;
wherein the perimeter forms an edge for a fuselage of the vehicle in which a first portion of the edge is a first chine and a second portion of the edge is a second chine, the substantially planar member running a full length of the fuselage of the unmanned aerial vehicle;
a number of flexible layers,
wherein a first flexible layer in the number of flexible layers covers the first side and is associated with the perimeter and a second flexible layer in the number of flexible layers covers the second side and is associated with the perimeter, and
wherein the number of flexible layers associated with the frame is configured to define a volume of the fuselage for the vehicle when the number of flexible layers is in an inflated configuration; and
a delivery system comprising:
an inflation system configured to change the number of flexible layers from an uninflated configuration to the inflated configuration; and
at least one of a missile and a gun, wherein the inflation system is configured to inflate the unmanned aerial vehicle when the at least one of the missile and the gun launches the unmanned aerial vehicle.

21. A method for deploying a first aircraft, the method comprising:
storing the first aircraft in a delivery system comprising an inflation system and at least one subsystem selected from a group consisting of a second aircraft different from the first aircraft, a missile, a gun, and a launcher;
activating the inflation system to generate a gas;
inflating, by the inflation system, at least one portion of the first aircraft with the gas in which a fuselage comprises a frame for the first aircraft and a number of flexible layers associated with the frame, the frame comprising an elongate member having a first side, a second side, and a perimeter, the frame running a full length of the fuselage of the first aircraft, in which the number of flexible layers is configured to define a volume for the at least one portion of the first aircraft when the number of flexible layers is in an inflated configuration, and in which the at least one portion of the first aircraft comprises the fuselage of the first aircraft; and launching the first aircraft by and from the at least one subsystem selected from the group consisting of the second aircraft different from the aircraft, the missile, the gun, and the launcher.

22. The method of claim 21, wherein the number of flexible layers associated with the frame form an outer mold line for the first aircraft in the inflated configuration.

23. The method of claim 22, in which a first flexible layer in number of flexible layers covers the first side and is associated with the perimeter and a second flexible layer in the number of flexible layers covers the second side and is associated with the perimeter.

24. The method of claim 23, wherein the perimeter forms an edge for the at least the portion of the first aircraft.

25. The method of claim 23, wherein the frame further comprises:
a plurality of members extending perpendicularly from at least one of the first side and the second side of the elongate member, wherein the plurality of members are configured to increase a rigidity of the at least the portion of the first aircraft.

26. The method of claim 25, wherein:
a number of systems are attached to at least two of the plurality of members, and
the at least two of the plurality of members extend perpendicularly and respectively from the first side and the second side of the elongate member such that the number of flexible layers do not touch the number of systems when the number of flexible layers are in an uninflated configuration.

27. The method of claim 21, wherein inflating the at least the portion of the aircraft with gas comprises when the first aircraft is launched by and from the at least one subsystem selected from the group consisting of the second aircraft different from the aircraft, the missile, the gun, and the launcher, inflating the at least the portion of the aircraft with the gas.

28. A method for deploying an unmanned aerial vehicle system, the method comprising:

activating an inflation system to generate a gas;
inflating a fuselage of an unmanned aerial vehicle with the gas in which the fuselage comprises:
a frame for the unmanned aerial vehicle in which the frame comprises:
an elongate member having:
a first side,
a second side, and
a number of members extending perpendicularly from at least one of the first side and the second side of the elongate member,
in which:
the number of members are configured to increase a rigidity of the fuselage,
the number of members are configured to contact the elongate member, and
at least one of the number of members is attached to a number of systems; and
a perimeter,
in which:
the frame runs a full length of the fuselage,
the perimeter forms an edge for the fuselage,
a first flexible layer in a number of flexible layers covers the first side and is associated with the perimeter, and
a second flexible layer in the number of flexible layers covers the second side and is associated with perimeter; and
the number of flexible layers associated with the frame, in which:
the number of flexible layers is configured to define a volume for the fuselage of the unmanned aerial vehicle when the number of flexible layers is in an inflated configuration, and
the number of flexible layers associated with the frame form an outer mold line for an aircraft in the inflated configuration; and
curing a curable coating on the number of flexible layers after the number of flexible layers is in the inflated configuration using an ultraviolet light system located in the fuselage.

* * * * *